United States Patent [19]

Matsumoto

[11] Patent Number: 4,792,830
[45] Date of Patent: Dec. 20, 1988

[54] METHOD FOR DETECTING DEFOCUSED PHOTOGRAPHIC IMAGES AND PHOTOGRAPHIC PRINTING DEVICE

[75] Inventor: Fumio Matsumoto, Tokyo, Japan

[73] Assignee: Fuji Photo Film Co., Ltd., Kanagawa, Japan

[21] Appl. No.: 129,117

[22] Filed: Dec. 4, 1987

[30] Foreign Application Priority Data

Dec. 5, 1986 [JP] Japan ................................ 61-289865

[51] Int. Cl.$^4$ ........................ G03B 27/52; G03B 27/32
[52] U.S. Cl. ........................................ 355/55; 355/77; 356/444
[58] Field of Search ................. 355/55, 77; 356/125, 356/71, 432, 433, 434, 435, 443, 444; 250/201

[56] References Cited

U.S. PATENT DOCUMENTS

| | | | |
|---|---|---|---|
| 3,709,613 | 1/1973 | Zahn et al. | 356/443 |
| 3,856,417 | 12/1974 | Bey et al. | 356/443 X |
| 3,981,579 | 9/1976 | Weinert et al. | 356/444 X |
| 3,984,184 | 10/1976 | Pflugbeil | 356/444 X |
| 4,001,594 | 1/1977 | Akimoto et al. | 356/443 X |
| 4,542,984 | 9/1985 | Shiota et al. | 356/125 X |
| 4,653,926 | 3/1987 | Fukui | 355/77 X |

Primary Examiner—Richard A. Wintercorn
Attorney, Agent, or Firm—Sughrue, Mion, Zinn, Macpeak & Seas

[57] ABSTRACT

In printing photographic film, photographic images or defocused images due to improper adjustment of focus at the time of photography should be eliminated from printing. There have been proposed various methods for the purpose. The typical prior art system is defective in that as its aperture has two different photometric systems, the sampling positions at larger and smaller spots should be synchronized to make the system complicated and bulky. The prior art system is further detrimental in that it has only one function, and therefore sensors for image photometry and frame position detection should be provided separately. This invention uses an image sensor having smaller picture elements for detecting image information, and spots for detecting defocused image are formed by the image sensor. This invention system therefore can precisely detect defocused images without necessity of plural photometric systems, and therefore can control exposure amount as well as detection of frame images. This invention can simplify the system, lower the manufacture cost, and obtain better precision for detection/control.

9 Claims, 8 Drawing Sheets

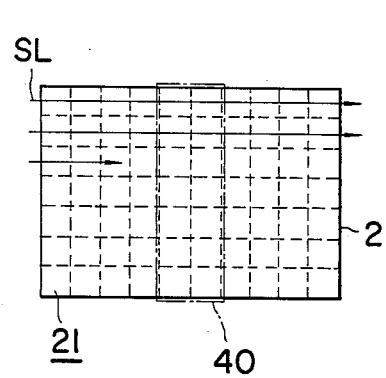
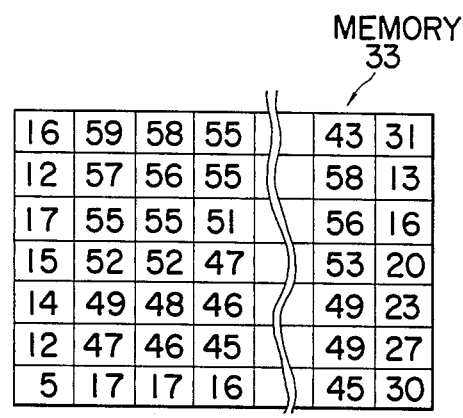
FIG. 4A        FIG. 4B
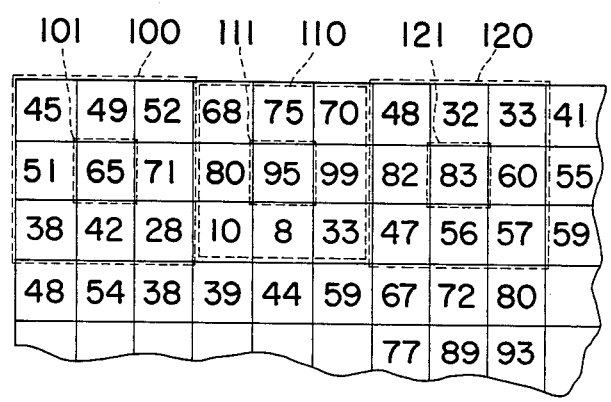
FIG. 5

METHOD FOR DETECTING DEFOCUSED PHOTOGRAPHIC IMAGES AND PHOTOGRAPHIC PRINTING DEVICE

BACKGROUND OF THE INVENTION

This invention relates to a method of detecting whether or not a photographic image recorded on a film is defocused (or blurred) and to a photographic printing device using such a method.

When a photographic film is to be printed, it is necessary to eliminate defocused images which are caused by improper focusing at the time of photography. There have been proposed various methods in prior art for detecting such defocused or blurred photographic images. One of them uses Fourier transform which discriminates defocused images eexamining whether or not their spectral components are within a predetermined domain of frequency. However, this method requires a highly precise, complicated and expensive system if Fourier transform is conducted optically. Further, if Fourier transform is conducted electrically, there has been no such device that can conduct Fourier transform at a speed high enough to match the printing speed of ordinary photographic printers. Another prior art method scans photographic films linearly to obtain the maximum density gradient within the high frequency band and the maximum density gradient of images blurred by removing the high space-frequency domain. The quotient of the two maximum density gradient is calculated. The method detects defocused images by examining whether or not the calculated quotient is larger than the prescribed threshold value (e.g. Japanese Patent Application Laid-open No. 70428/1978). The method, however, is detrimental in that the number of measuring points becomes too many to conduct high-speed processing, that as the measurement of density gradient largely depends on the scanning direction, it is difficult to obtain two-dimensional density gradients, and that the system becomes too complex as it requires separate circuits for obtaining the maximum value in the density gradients and for obtaining the quotient of the two density gradients.

In detecting defocused photographic images in the prior art as shown in FIG. 1, a scanning region 201 is synchronized with a negative film 200 by two photometric systems, and a smaller picture element 202 and a larger picture element 203 which is concentric with the smaller element are positioned within the scanning region 201 as sampling positions. The smaller and the larger picture elements 202 and 203 are so-called blur-masks, and they photometrically measure the same sampling point on the negative film 200 by spots of two sizes, i.e. a larger and a smaller spot sizes. FIG. 2 shows a typical embodiment of the system wherein the light emitted from a light source 210 passes through a condenser lens 211, and reaches a photographic film 220 which is being moved in the direction indicated by an arrow mask. Photographic images are recorded on the photographic film 220 and are illuminated with the light from the light source 210. The light transmitted through the photographic film 220 is divided by a half mirror (a beam splitter) 212 into transmitted light and reflectd light. The light transmitted through the half mirror 212 passes as an incident light, a lens 213, a mirror 214 and a slit 215 to finally reach a photoelectric multiplier 216 to be converted into electric signals. The lens 213 is positioned in a manner to focus the aperture of the slit 215 on the photographic film 220.

The light reflected from the half mirror 212, on the other hand, passes through a lens 217, and a slit 218 and enters a photoelectric multiplier 219. The slit 218 has an aperture larger than the slit 215. If it is assumed that the size of the slit 215 is 1 mm$^2$ in the aperture thereof, the slit 218 is 10 mm$^2$ in the aperture thereof, and the scale factor of the lenses 213 and 217 is 1/10, the photometrical measuring area on the photographic film 220 becomes 0.1 mm$^2$ and 1 mm$^2$, respectively.

The output signals from the photoelectric multipliers 216 and 219 are fed to a differential amplifier 221 via a logarithmic converter 221 if the operation is conducted in terms of density values, and as they are, if the operation is in terms of transmittivity to obtain the difference $\Delta D$ between the two signals. The signals outputted from the fifferential amplifier 221 are inputted to integrator 223 and 224 which collect the signals in the unit of a suitable width, integrates and calculates their frequency distribution. The integrator 223 integrates the signals in the scope $-0.15 \leq D \leq 0.15$ while the integrator 224 integrates the signals in the scope $\Delta D < -0.15$ and $0.15 < \Delta D$. The cumulative frequencies calculated for divided segments are fed to a comparator 225 to obtain, for instance, the ratio among them and to judge whether or not the ratio is larger than a predetermined constant k. If the ratio is larger than the constant k, a signal indicating the image is clearly focused is outputted while if it is smaller than the constant k, a signal indicating it is defocused is outputted.

As described in the foregoing, as the conventional defocused image detecting system has two photometric systems having aperture of different sizes, it is necessary to synchronize the sampling positions for the larger and smaller spots thereby inevitably making the system complex and bulky. The conventional defocused image detector is further detrimental in that it functions for a single purpose alone. Sensors for image photometry in photographic printing and for image frame position detection had to be provided separately.

SUMMARY OF THE INVENTION

This invention was contrived to eliminate aforementioned problems encountered in the prior art, and aims at providing a system for detecting defocused photographic images which can accurately detect defocused (blurred) photographic images without the necessity for using plural photometric system of different aperture sizes.

Another object of this invention is to provide a photographic printing system which can detect. photographic image information and frame images position-wise.

According to one aspect of this invention, for achieving the objects described above, there is provided a system for detecting defocused photographic images comprising an image sensor which receives light either transmitted through or reflected from photographic images recorded on a photographic film in a large number of picture elements arranged in row and column, a photometric spot forming means which forms larger phtometric spots by synthetically processing the image information signals detected by said image sensor in the form of cells and smaller photometric spots corresponding to said larger photometric spots in row and line, and a defocused image detecting means which obtains density values of said photographic images at said larger and smaller photometric spots, and judges the degree of blurredness of said photographic images based on the characteristic distribution of said photometric spots.

According to another aspect of this invention, there is provided a photographic printing system comprising an image sensor which receives light either transmitted through or reflected from photographic images recorded on a photographic film in a large number of picture elements arranged in row and column, a photometric spot forming means which forms larger photometric spots by synthetically processing the image information signals detected by said image sensor in the form of cells and smaller photometric spots corresponding to said larger photometric spots in row and column, a defocused image detecting means which obtains density values of said photographic images at said larger and smaller photometric spots, and judges the degree of blurredness of said photographic images based on the characteristic distribution of said photometric spots, and a means which calculates exposure amount of photographic printing based on the image information signals at the larger photometric spot formed by said photometric spot forming means.

The nature, principle and utility of the invention will become more apparent from the following detailed description when read in conjunction with the accompanying drawings.

BRIEF DESCRIPTION OF THE DRAWINGS

In the accompanying drawings:

FIG. 4A is an explanatory view for scanning by an image sensor;

FIG. 4B is a view to show an example of data storage in a memory;

FIG. 5 is an explanatory view of the principle of this invention;

DESCRIPTION OF THE PREFERRED EMBODIMENTS

Figure 3:
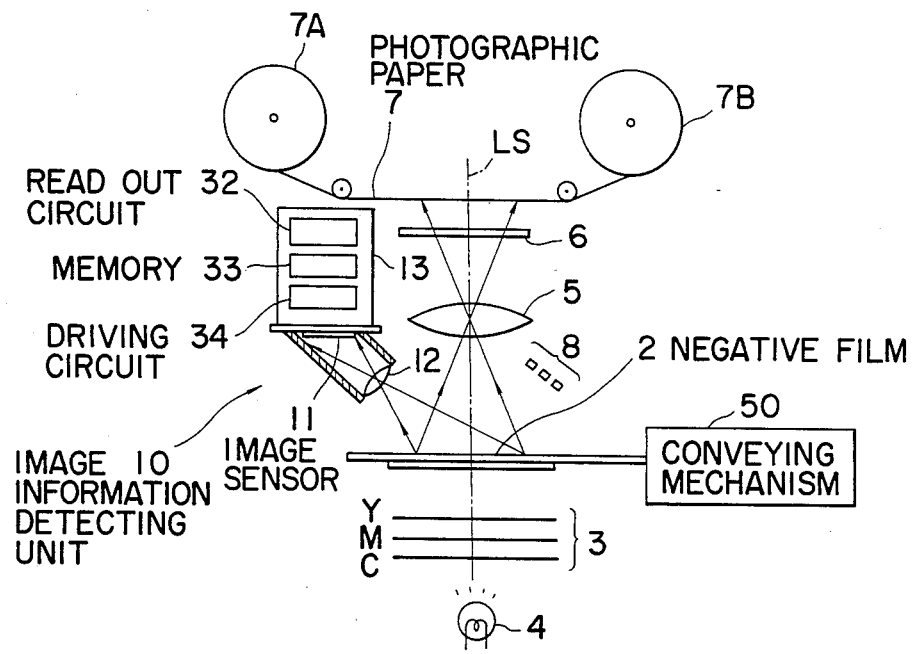
FIG. 3 is a structural view to show an embodiment of installation of an image information detecting until with an image sensor according to this invention.
Figure 2:
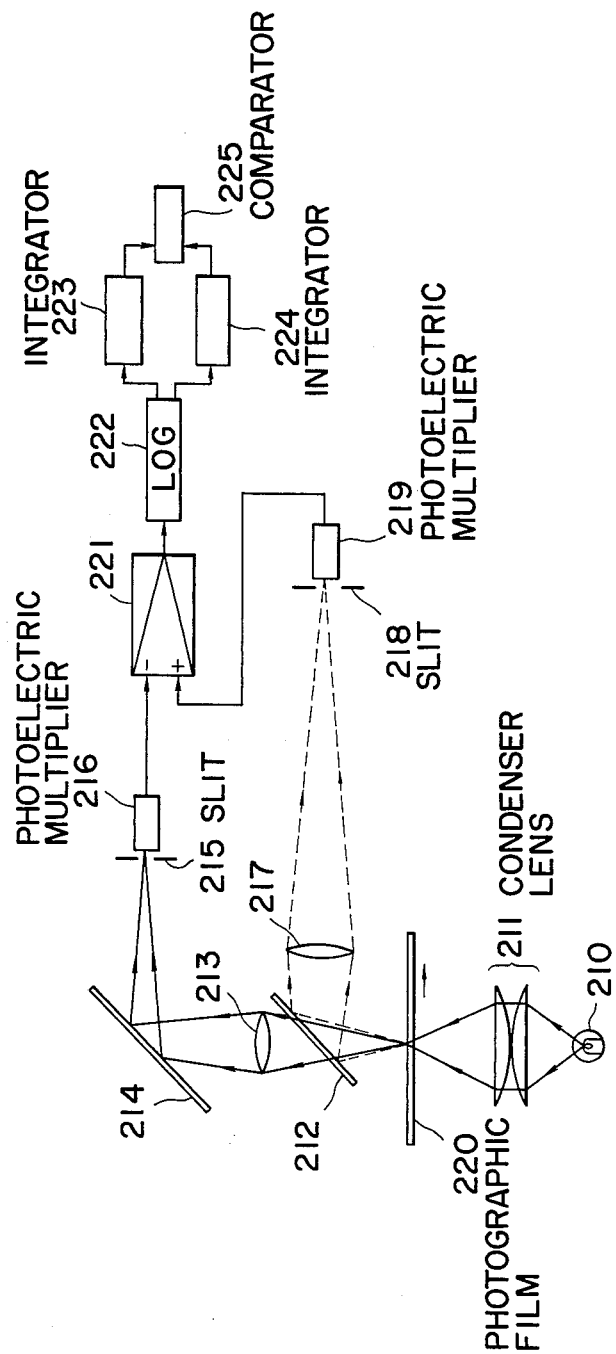
FIG. 2 is a block diagram to show an embodiment of the conventional defocused image detecting system.

As shown in FIG. 3, there is positioned close to a negative film 2 an image information detecting unit 10 comprising a two-dimensional image sensor 11 of a plane scanning type consisting of, for example, CCD (Charge Coupled Device), a lens system 12 for focusing the substantially central part of the measuring frame of the negative film 2, and a substrate 13 having a processing circuit comprising ICs in units of a read out circuit 32, a memory 33, a driving circuit 34, etc. for dividing a frame of the negative film 2 into a large number of aligned picture elements and detecting picture image information therefrom. More particularly, when a predetermined driving signal is fed to an image sensor 11 from the driving circuit 34, the two-dimentional image sensor 11 receives via the lens system 12 the light which transmits through the negative film 2 placed on a printing section. The image sensor 11 therefore can divide the whole area of one frame of the negative film 2 into a large number of small picture elements 21 which are aligned in row and column as shown in FIG. 4A, and scans the whole area of the negative film 2 in accordance with the scanning lines sequentially. When the whole frame area has been completely scanned, the image sensor 11 outputs photographic image signals sequentially from the output register thereof, the signals are sampled and held by, for instance, sample-holding circuit within the read out circuit 32, and the sample-held values are converted into digital signals by an A/D converter. The digital signals from the A/D converter are converted in logarithm by a logarithmic converter into density signals. The density signals are controlled by a write-in controller so that they are stored in the memory 33 in terms of density digital values of the negative film 2 (or in terms of antilogarithmic digital values without passing the signals through the logarithmic converter) and in arrangement corresponding to picture elements 21 as shown in FIG. 4B.

The photographic printing unit in FIG. 3 will now be described schematically. The negative film 2 which has been conveyed by a conveying mechanism 50 to the printing unit is illuminated with the light from a light source 4 via three complementary color filters 3, i.e. yellow (Y), magenta (M) and cyan (C); and the light transmitted through the negative film 2 reaches a sheet of photographic paper 7 via a lens system 5 and a black shutter 6. The photographic paper 7 is wound on a feed reel 7A, and moved to become rolled on a take-up reel 7B in synchronization of conveyance and suspension of the negative film 2. Close to the lens system 5 for the negative film 2 is provided photosensors 8 such as photodiodes for detecting image density information in three primary colors of red (R), green (G) and blue (B). The photographic printing is conducted with the detection signals from the photosensors 8.

Figure 1:
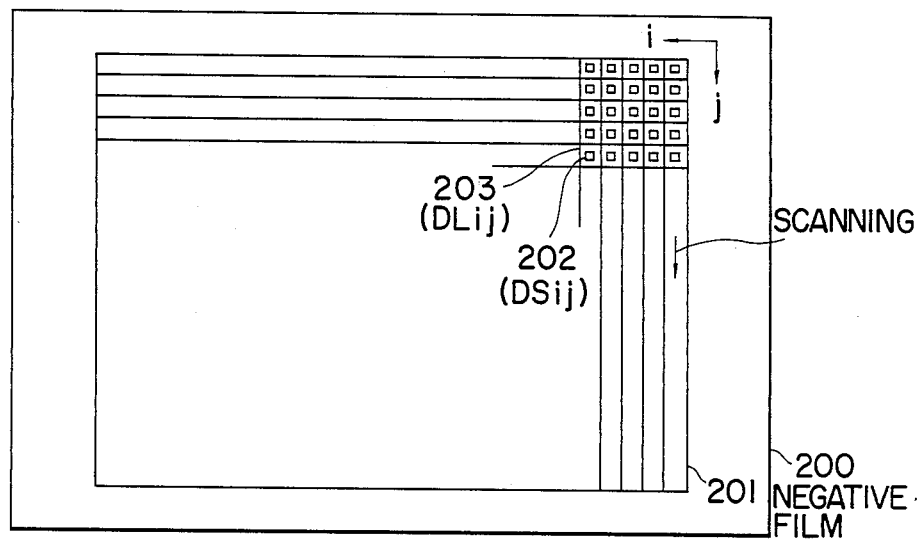
FIG. 1 is an explanatory view to describe the principle of detection of defocused picture images.

According to this invention, the data sored in the memory 33 in correspondence with the detected picture elements by the image sensor 11 as described in the above are grouped by average integrated value of 9 picture element data or 3×3 elements to form aforementioned larger picture elements 100, 110, 120.... as shown in FIG. 5. The center of a larger picture element is designated respectively as smaller picture elements 101, 111, 121, ... to form makes for detecting defocused images. The numbers of the picture elements in the larger and smaller groups may be determined arbitrarily, and the smaller picture elements are not necessarily located at the center of each larger picture element so far as it is positioned within the larger picture elements respectively. As the data detected by the image sensor are sorted into a group of larger picture elements and a group of smaller picture elements comprising one or more picture elements within a larger picture element group according to this invention, the larger and smaller picture elements described in FIG. 1 can be formed without using two photometric system of different slit apertures. The density values of the larger or smaller picture element can easily be obtained by software such as a CPU, i.e. a group number corresponding to the address number of a particular picture element is referred to a data table to find its density value, then the density values of a group are integrated, and the integrated values are averaged.

After obtaining density values, blur-masks for the larger and smaller picture elements are formed and then the defocused images are detected. An example of the operation will now be described.

Figure 6A:
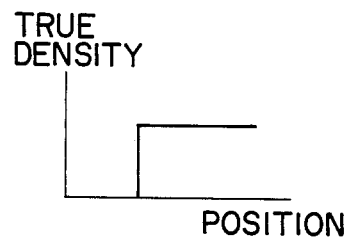
FIGS. 6 through 9 are views to explain the principle of defocused image detection of this invention.

FIGS. 6A through 6D are the graphs to show density measurement of in-focus picture images wherein in-focus images have the density gradient as shown in FIG. 6A because the edge images of in-focus images have greater density gradients. If an original image is measured in regions of different measurement areas, the density of the smaller measurement area becomes the one shown in FIG. 6B while the density in the larger measurement area becomes the one shown in FIG. 6C where the gradient is gradual.

Figure 6D:
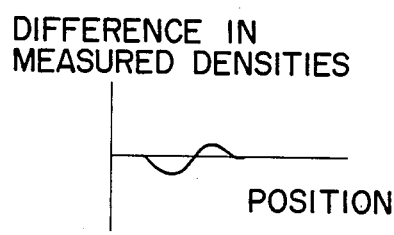
Figure 7:
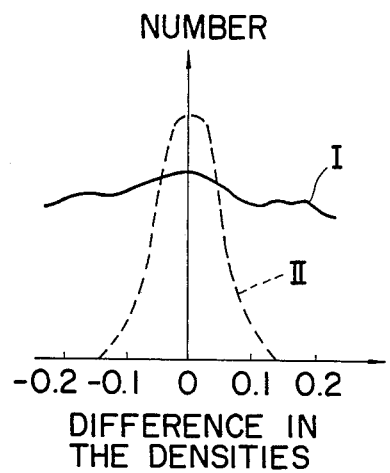

The curve shown in FIG. 6D shows the difference between densities of two different measurement areas. Since the difference in density between the two measurement areas is generally large in in-focus images, the amplitude of the curve becomes large. These density values are sampled to count the number located within a segment classified by a desired density amplitude. If the difference in density is plotted on the abscissa and the number is plotted on the ordinate, the characteristic curve I shown in FIG. 7 is obtained.

Figure 8A:
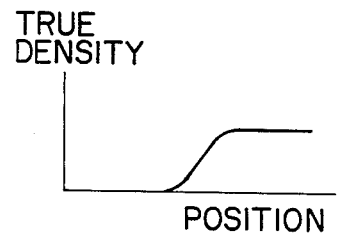
Figure 6B:
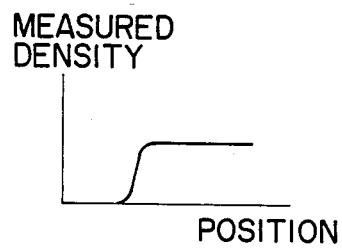
Figure 8B:
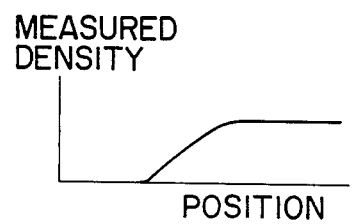
Figure 6C:
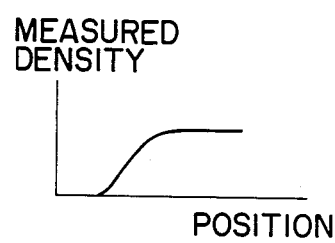
Figure 8C:
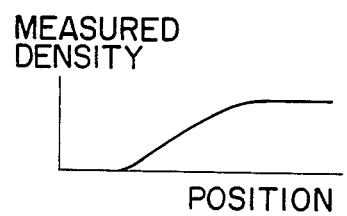
Figure 8D:
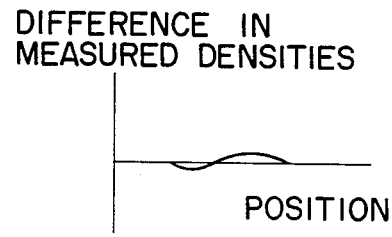

FIGS. 8A through 8D indicate measurement of the same object as used in FIGS. 6A through 6D, but the image is out of focus. Since the change in density is gradual at the edge in defocused images, the curve becomes as shown in FIG. 8A. If the edge image is measured by two regions having different measurement areas, two gradual curves as shown in FIGS. 8B and 8C are obtained, the difference being as small as shown in FIG. 8D. Similarly to the above, the difference in measured densities is sampled to obtain a frequency distribution curve as shown by the characteristic curve II in FIG. 7. As is obvious from these characteristic curves I and II, there is a distinct difference in frequency distribution curve between the in-focus images and the out-of-focus images. Therefore, if a characteristic value clearly identifying such a difference is used, the defocused images can be detected from the value.

If the measured density at column i and row j of the smaller picture elements (101, 111, 121, ...) of FIG. 5 is denoted as $DS_{ij}$, and the measured density at column i and row j in the larger picture elements (100, 110, 120, ...) is denoted as $DL_{ij}$, the difference between picture element $\Delta D_{ij}$ is obtained by the following equation (1).

$$\Delta D_{ij} = |DL_{ij}| \quad (1)$$

Figure 9:
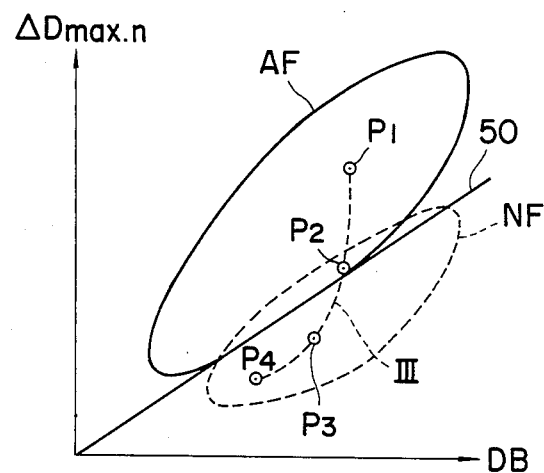

The value $D_{max\text{-}n}$ which is the nth (1~m/2) from the maximum among the differences $\Delta D_{ij}$ corresponding to all the picture elements (for instance, in the number of m) is plotted on the ordinate axis as shown in FIG. 9. Then, the absolute value DB of the density difference between adjacent sampling points (vertical and horizontal) either in the smaller picture element 202 or the larger picture element 203 is obtained by following equation.

$$DB = \sum_{i,j} |DL_{i,j} - DL_{i+1,j}| + \sum_{i,j} |DL_{i,j} - DL_{i,j+1}| \quad (2)$$

or $$DB = \sum_{i,j} |DS_{i,j} - DS_{i+1,j}| + \sum_{i,j} |DS - i, j - DS_{i,j+1}| \quad (3)$$

The value DB obtained from the aforementioned equation (2) or (3) is plotted on the abscissa axis as shown in FIG. 9. The relation between such values and the density difference $\Delta D_{ij}$ can determine the region where in-focus images are distributed as shown by the letters AF in the graph and the region where defocused images are distributed as shown by the letters NF. This is because the value DB indicates the total of local contrasts of an image. In other words, the larger the contrast, the larger becomes the value DB. The density difference $\Delta D_{ij}$ represents the intensity of edges in the picture. It becomes possible to obtain in advance a defocused image distribution curve 50 from the in-focus image region AF and the defocused image region NF. Any negative film can be judged simply and quickly whether the images recorded on it is in- or out-of-focus simply by referring its characteristic point P with $\Delta D_{max\text{-}n}$ and DB to FIG. 9. If the amount of defocused images increases in a single picture, the characteristic curve III of FIG. 9 is obtained. More particularly, the image is focused correctly at the point $P_1$, situated on the boundary between in- and out-of-focus at the point $P_2$, and out-of-focus completely at the points $P_3$ and $P_4$.

Figure 10:
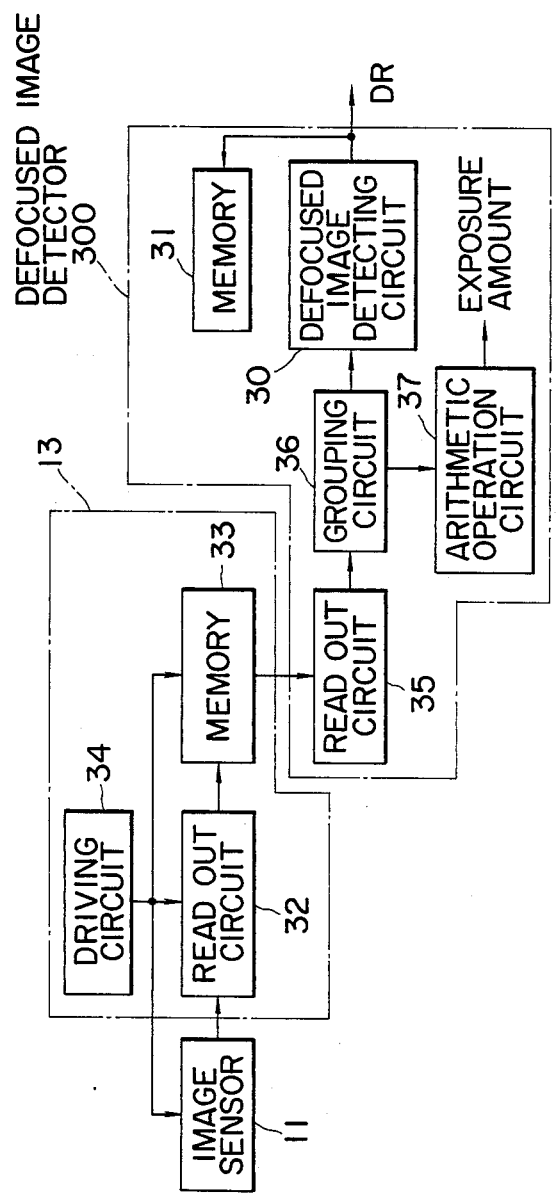
FIG. 10 is a block diagram to show an embodiment of this invention.

FIG. 10 shows a block diagram of defocused image detector 300 using an image sensor described above. More specifically, an image sensor 11 in the figure is driven by a driving circuit 34 to receive the light either transmitted through or reflected from a photographic film and to read it photoelectrically via a read out circuit 32. The images thus read are digitalized and stored in a memory 33 in a manner shown in FIG. 4B. The density data stored in the memory 33 are read out by a read out circuit 35 and grouped into larger picture element groups and smaller picture element groups by a grouping circuit 36. Density data of both larger and smaller picture elements are respectively inputted to a defocused image detecting circuit 30. The defocused image detecting circuit 30 judges the negative film whether it is in-focus or not, and outputs the result DR of the judgement. The judgement result DR is stored in a memory 31 to prevent the defocused images from being printed based on the stored data. Although all the detected data are herein stored in the memory 33, and are grouped into the smaller picture element groups 101, 111, 121, ... and the larger picture element groups 100, 110, 120, ... when they are read out from the memory 31, the detected data from the image sensor 11 can be grouped directly without being stored in the memory 31.

Since the image sensor 11 of the image information detecting unit 10 detects whole data on an image frame of a negative film as shown in FIG. 4B, and the memory 33 stores them in divided segments, these data can be utilized for controlling the exposure amount in photographic printing and for controlling the suspension of detecting operations.

In photographic printing systems, it is necessary to measure the density of a negative film in order to precisely determine the exposure amount or correction amount for printing. Conventionally, the average density of the negative film is photometrically measured by photosensors such as photodiodes provided near the optical path in the printing system in terms of LATD (Large Area Transmittance Density). Since this image detection in LATD is to measure the negative film photometrically in average rather than to measure the image density precisely across the whole frame, the exposure or correction for printing cannot always be obtained precisely by the method. Since the memory 33 stores digital values for respective picture elements on the negative film 2 or density values for respective picture elements in relation to three primary colors, digital value for each of the picture element can be read out from the memory 33 for multiple uses. If the density values are obtained for each of the three primary colors of RGB as shown in FIG. 4B and are stored, such values can be easily read out from the memory 33 for arithmetic operations to thereby conduct determination or correction of printing exposure amount similarly to the prior art. The image information used in arithmetic operations may be image data of relatively low resolution such as in the unit of 1 mm on the negative film 2, and therefore the density value data in the larger picture element groups grouped in the grouping circuit 36 can be sufficiently used. The use of such data can reduce the operation time at an arithmetic operation circuit 37 and enhance the efficiency in processing.

In the photographic printing, a frame of the negative film 2 is segmented in order to obtain image information, and an exposure amount suitable for a scene is calculated from thus obtained image information for each segment. More particularly, if it is assumed that the average transmission density is denoted as $D_a$, the maximum density in divided segments as $D_{max}$, and the minimum density as $D_{min}$, the exposure amount $X_1$ of a 135 F type size film is expressed by the equation below (4)

$$X_1 = a_1 \cdot D_a + b_1 \cdot D_{max} + c_1 \cdot D_{min} + d_1 \quad (4)$$

The exposure amount $X_2$ of 110 type size film is expressed as below.

$$X_2 = a_2 \cdot D_a + b_2 \cdot D_{max} + c_2 \cdot D_{min} + d_2 \quad (5)$$

If a correction formula $X_s$ $$X_s = K_i + K_j X \quad (6)$$

is prepared to correct the exposure amount X thus obtained for each size of the negative film, any negative film can be printed with the exposure amount $X_s$ corrected precisely to correspond to the size. The coefficients $K_i$, $K_j$ used in the equations are those determined by experiments for film sizes.

Figure 11:
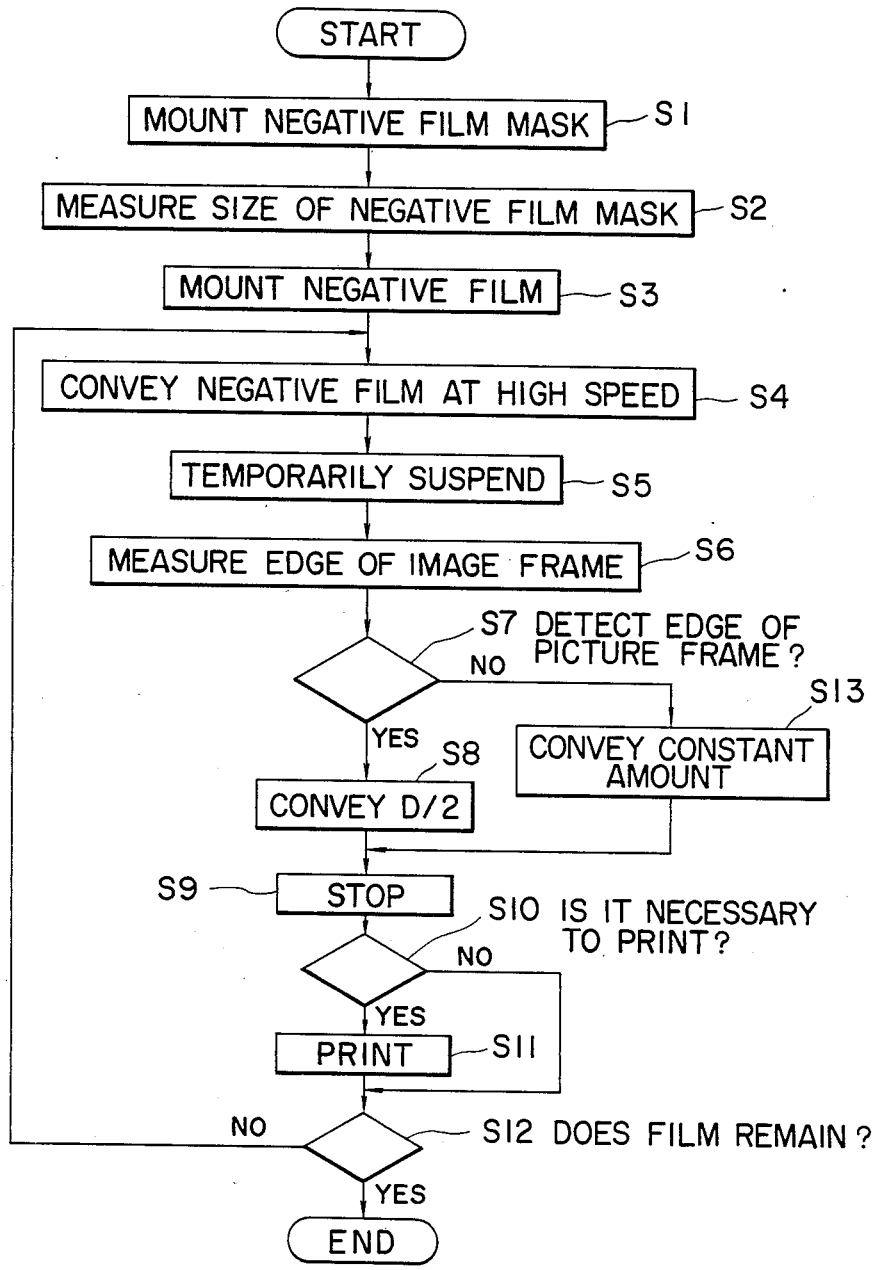
FIG. 11 is a flow chart to show an example of control for suspension of detection.

FIG. 11 shows a flow chart to show an embodiment of a method for suspending the detection of imaged frames wherein a negative film mask 41 corresponding to the size of the negative film 2 to be printed is mounted at a predetermined position (Step S1), the size of the aperture of the negative film mask 41 is measured by the image sensor 11 (Step S2). The measurement of the sizes may be inputted visually. The information on size measurement may be used to determine the transportation of the negative film 2, automatically select or extract a picture element array 40, and further control the printing exposure and correction amounts.

Figure 12:
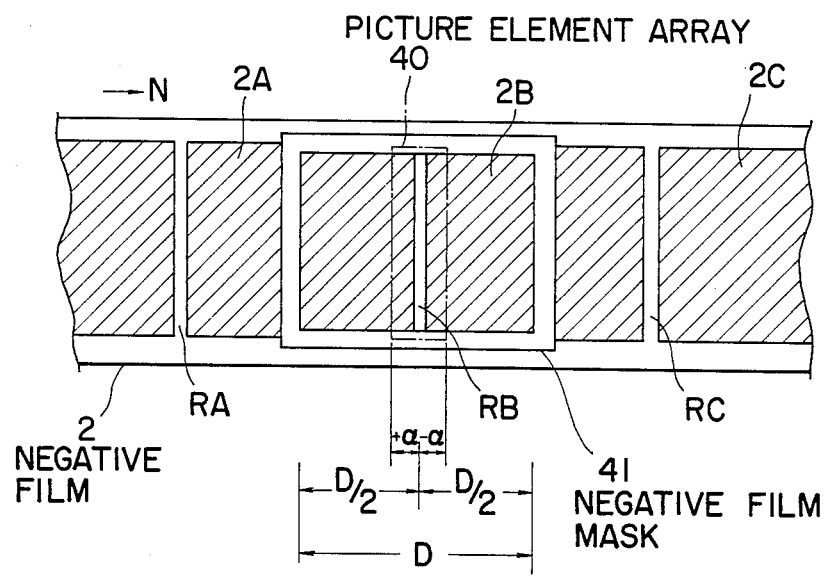
FIG. 12 is an explanatory view to describe operation thereof.

The negative film 2 is mounted at a position where an unimaged frame at the top end of the negative film 2 is positioned corresponding to the aperture of the negative film mask 41 (Step S3), and a motor is actuated to convey at a high speed the negative film 2 by one half of the inter-frame distance D or about D/2 when the top end of the negative film 2 is mounted on a negative drive rollers (Step S4). The negative film 2 is suspended temporarily (Step S5), and image information is detected by the image sensor 11 to obtain data for each picture element. Since there is a distinctive difference in density which generally exists between the imaged frames and the unimaged interval spaces, an edge between the imaged frame and the unimaged interval spaces can be detected simply by seeking for a region in the picture element array 40 (refer to FIG. 4A) of the image sensor 11 which has a density value less than a predetermined value, and which changes drastically in a horizontal direction but stays within a predetermined scope in a vertical direction (i.e. the direction perpendicular to the conveying direction of the negative film 2). FIG. 12 shows the state of such detection wherein the negative film 2 is being conveyed to the negative film mask 41 at the printing section in the direction of N, and the edge of the unimaged regions RB between the imaged frames is detected in the picture element array 40 of the picture image information detecting unit 10. The picture element array 40 of the image sensor 11 is arranged to be positioned at the center of the negative film mask 41.

When an edge of the unimaged region RB between the imaged frames 2A is detected, correction amount $\alpha$ is either added $(+\alpha)$ or subtracted $(-\alpha)$ from the amount for the picture element array where the edge is actually detected, the negative film 2 is conveyed by the distance D2 or until the particular frame is positioned at the printing section based on the size information obtained from the size measurement of the Step S2) (Steps S6, S7, S8). Then, the operation is stopped (Step S9). The distance between the edge of the unimaged region RB between the imaged frame 2A at the center of the negative film mask 41 and another frame can be calculated if only the frame size is known. Then, the negative film 2 can be conveyed and positioned at the printing section precisely by moving it by $(D/2+\alpha)$ or $(D/2-\alpha)$ from the position shown in FIG. 12. The total transportation amount is either $(D+\alpha)$ or $(D-\alpha)$. Since the firstframe of the negative film 2 is often confused with an unimaged frame, the first frame may be moved manually. In such a case, the step S9 starts immediately after the step S3 in the flow chart in FIG. 11. When the edge is not detected in the picture element array 40 of the image information detecting unit 10, the negative film 2 is conveyed by a constant amount, e.g. an inter-frame distance D (Step S13).

After repeating these conveyance/suspension operations, the particular frame is judged whether or not it is printable (Step S10), if it is not suitable for printing, the procedure will skip to the step S12, and if it is suitable, the frame is printed with the exposure amount and the correction amount which have been determined in advance (Step S11). After having printed this frame, the negative film 2 is conveyed at a high speed by one half of the inter-frame distance D based on the size information obtained at the step S2 to examine whether or not there is any more frame to print (Step S12, S4). The presence/absence of the negative film 2 is judged simply as there is not the negative film 2 on the negative film mask 41, all the image information at the aperture become "0" (or close to "038). Whether or not a particular frame which is suspended at the mask is suitable for printing (Step S10) can be judged by detecting the values in the photographic image information of FIG. 4B: i.e. when all of the information becomes above a predetermined value, the frame is extremely over-exposed, when they are less than a predetermined value, the frame is extremely under-exposed, and when they are within a predetermined scope of values, it is extremely low-contrasted. By utilizing the result of judgement result DR by the defocused detecting circuit 30, defocused picture images are prevented from being printed. Imaged frames are automatically printed sequentially by repeating aforementioned conveyance/suspension operations. When the step S12 finds no more negative film, the idle driving of the negative rollers are automatically suspended to finish the operation.

The picture element array of the two-dimensional image sensor is by no means limited to be positioned at the center thereof. A one-dimensional image sensor or a line sensor may be used for detecting image information so far as auxiliary scanning is synchronized with negative film feeding so that main scanning is conducted by the one-dimensional image sensor. If there is sufficient picture element resolution, at the smaller measurement spot just like at the larger measurement spot, image information signals (picture element signals) may be synthetically processed to form picture elements in cell.

As described in the foregoing statement, this invention defocused image detecting system can precisely detect defocused or blurred images on a negative film with only one photometic system as well as to control exposure amount and suspension of frame image detection. The system is therfore extremely advantageous as it is simple in structure, low in cost, and precise in detection/control.

It should be understood that many modifications and adaptations of the invention will become apparent to those skilled in the art and it is intended to encompass such obvious modifications and changes in the scope of the claims appended hereto.

What is claimed is:

1. A system for detecting defocused photographic images comprising an image sensor which receives light either transmitted through or reflected from photographic images recorded on a photographic film in a large number of picture elements arranged in row and column, a photometric spot forming means which forms larger photometric spots by synthetically processing the image information signals detected by said image sensor in the form of cells and smaller photometric spots corresponding to said larger photometric spots in row and column, and a defocused image detecting means which obtains density values of said photographic images at said larger and smaller photometric spots, and judges the degree of blurredness of said photographic images based on the characteristic distribution of said photometric spots.

2. The system for detecting defocused photographic images as claimed in claim 1 wherein said image sensor is used as the sensor to measure exposure amount for printing said photographic film.

3. The system for detecting defocused photographic images as claimed in claim 1 wherein said image sensor is used as the sensor to suspend the detection of photographic image frames for said photographic film printing.

4. The system for detecting defocused photographic images as claimed in claim 1 wherein said image sensor is a two-dimensional image sensor.

5. A photographic printing system comprising an image sensor which receives light either transmitted through or reflected from photographic images recorded on a photographic film in a large number of picture elements arranged in row and column, a photometric spot forming means which forms larger photometric spots by synthetically processing the image information signals detected by said image sensor in the form of cells and smaller photometric spots corresponding to said larger photometric spots in row and column, a defocused image detecting means which obtains density values of said photographic images at said larger and smaller photometric spots, and judges the degree of blurredness of said photographic images based on the characteristic distribution of said photometric spots, and a means which calculates exposure amount for photographic printing based on the image information signals at the larger photometric spot formed by said photometric spot forming means.

6. The photographic printing system as claimed in claim 5 wherein the photographic image is not printed if the defocused image is detected by said defocused image detecting means.

7. The photographic printing system as claimed in claim 5 wherein said image sensor is a two-dimensional image sensor.

8. The photographic printing system as claimed in claim 5 further includes a memory for storing the data outputted from said image sensor.

9. The photographic printing system as claimed in claim 8 wherein said photometric spot forming means comprises a read out circuit for reading the data stored in the memory and a grouping circuit for grouping the read out data into said smaller and larger photometric spots.

* * * * *